(12) United States Patent
Khan et al.

(10) Patent No.: US 6,947,756 B2
(45) Date of Patent: Sep. 20, 2005

(54) METHOD OF BALANCING BACKHAUL DELAYS FOR A SERIES OF DAISY CHAINED RADIO BASE STATIONS

(75) Inventors: Irfan Khan, San Diego, CA (US); Kuo-Chun Lee, San Diego, CA (US)

(73) Assignee: Telefonaktiebolaget LM Ericsson (SE)

( * ) Notice: Subject to any disclaimer, the term of this patent is extended or adjusted under 35 U.S.C. 154(b) by 618 days.

(21) Appl. No.: 10/035,948

(22) Filed: Dec. 24, 2001

(65) Prior Publication Data

US 2003/0119556 A1 Jun. 26, 2003

(51) Int. Cl.$^7$ ................................................ H04Q 7/20
(52) U.S. Cl. .................... 455/456.5; 455/560; 455/561; 370/349; 370/389
(58) Field of Search .......................... 455/560, 456.5, 455/561, 403, 435.3, 440, 456.1, 456.3, 404.2, 442.1, 428, 449, 446, 445, 500, 426.1–426.2, 424, 425, 550.1, 575.1; 370/349, 389, 230, 395.2, 395.4, 395.42, 412, 386, 436, 428, 337, 60, 342, 522, 442, 252, 395, 474, 338, 395.1, 471, 311, 429, 329, 352, 444, 360, 345.4, 39.5, 235; 379/266.03, 266.06; 709/235

(56) References Cited

U.S. PATENT DOCUMENTS

| | | | | |
|---|---|---|---|---|
| 4,616,359 A | * | 10/1986 | Fontenot | 370/230 |
| 5,862,485 A | * | 1/1999 | Linneweh, Jr. et al. | 455/450 |
| 6,108,316 A | * | 8/2000 | Agrawal et al. | 370/311 |
| 6,125,110 A | * | 9/2000 | Proctor et al. | 370/331 |
| 6,167,049 A | * | 12/2000 | Pei et al. | 70/395.43 |
| 6,317,453 B1 | | 11/2001 | Chang | |
| 6,490,264 B1 | * | 12/2002 | Suzuki | 370/338 |
| 6,501,733 B1 | * | 12/2002 | Falco et al. | 370/235 |
| 6,765,905 B2 | * | 7/2004 | Gross et al. | 370/389 |
| 6,778,536 B1 | * | 8/2004 | Ofek et al. | 370/395.4 |
| 2003/0012212 A1 | * | 1/2003 | Earnshaw et al. | 370/428 |

* cited by examiner

Primary Examiner—Edward F. Urban
Assistant Examiner—Charles Chow
(74) Attorney, Agent, or Firm—Coats & Bennett, P.L.L.C.

(57) ABSTRACT

A radio access network comprises a base station controller and a plurality of radio base stations. The radio base stations connect to the base station controller in a daisy chain configuration via a shared communication link. At least one radio base station in the chain includes a priority queue for scheduling packets to be transmitted via the shared communication link to an adjacent radio base station. The priority queue schedules packets for transmission over the shared communication link based on the location of the terminating radio base station for each packet so that packets traversing more hops are given priority over packets traversing fewer hops.

48 Claims, 4 Drawing Sheets

FORWARD LINK

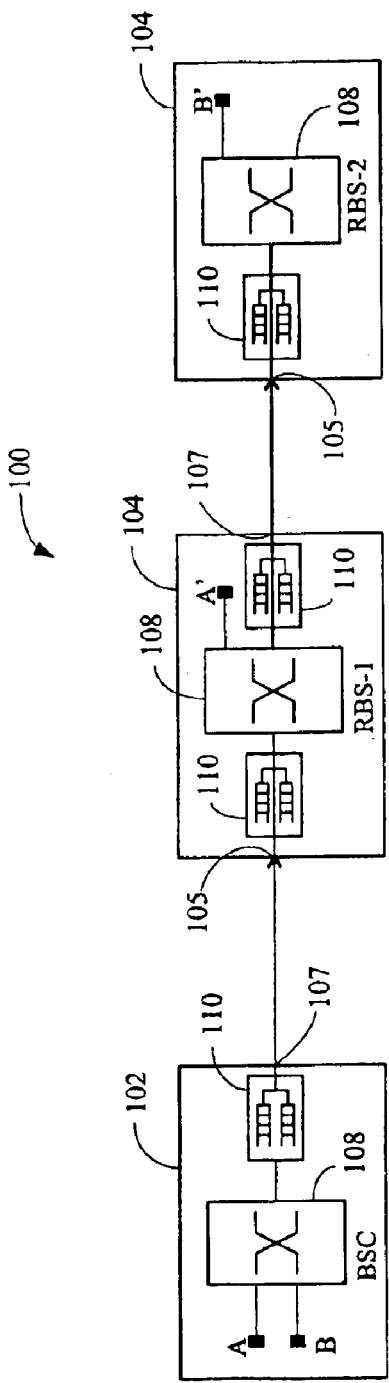
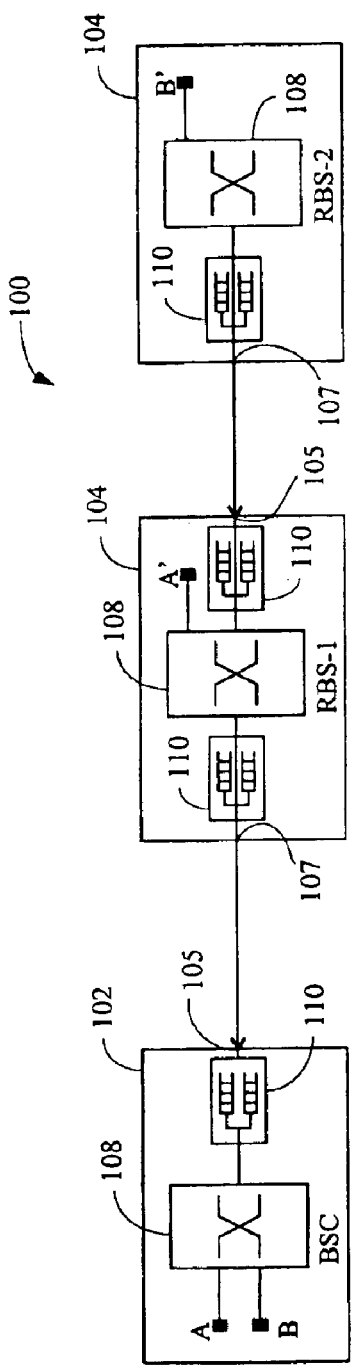
FIG. 3A
FORWARD LINK
FIG. 3B
REVERSE LINK

METHOD OF BALANCING BACKHAUL DELAYS FOR A SERIES OF DAISY CHAINED RADIO BASE STATIONS

BACKGROUND OF THE INVENTION

The present invention relates generally to wireless communication networks comprising a plurality of radio base stations for communicating with mobile terminals, and, more particularly, to a method of balancing backhaul delays for a series of radio base stations connected in a daisy chain to a base station controller.

In a mobile communication network, the service area is divided into a plurality of cells, each of which is served by a radio base station. Each base station comprises radio resources for communicating with local terminals within the cells served by that base station. A number of radio base stations can be connected to a single base station controller, typically via leased T1 or E1 lines. A common network topology used to connect multiple radio base stations to a single base station controller is a star topology. In the star topology, each radio base station connects to the base station controller via a dedicated line. The star topology is an efficient topology for routing data packets between a base station controller and multiple radio base stations. A disadvantage of the star topology is that it requires a dedicated line between the base station controller and each radio base station, which increases the cost of operating the network.

In order to save leased line costs, some network operators use a daisy chain topology to connect multiple radio base stations to a single base station controller. In a daisy chain topology, the radio base stations are connected in series with the base station controller. The first radio base station in the series connects directly to the base station controller. Each subsequent radio base station connects to the previous radio base station. Thus, more than one radio base station can share a single leased line to the base station controller. Instead of connecting directly to the base station controller which may be far away, a radio base station may instead connect to a neighboring radio base station which is much closer. Using a daisy chain topology can result in a significant reduction of leased line costs to the network operator. However, the daisy chain topology is not without its disadvantages.

One disadvantage of the daisy chain topology is that the transmission delays between the base station controller and the radio base stations may be significantly increased, particularly for the radio base stations toward the far end of the daisy chain. A number of factors may contribute to transmission delays, including packet queuing delays and processing delays in each radio base station in the daisy chain. Thus, each hop along the daily chain adds additional delay to packets being delivered. The amount of the transmission delay is directly related to the number of hops that the data packet traverses to reach the intended radio base station. Radio base stations at the far end of the daisy chain will experience longer delays than will radio base stations closer to the base station controller. For some applications, particularly ones that can tolerate large latency periods, these delays will not be critical. Other applications, such as voice or streaming applications, are more sensitive to transmission delays. In these applications, longer delays mean a lower quality of service.

SUMMARY OF THE INVENTION

The present invention provides a method for balancing transmission delays on the backhaul connections between a base station controller and multiple radio base stations connected to the base station controller in a daisy chain configuration. Each radio base station or node in the chain includes a switching circuit for switching packets intended for that node to a local port. Packets being forwarded to the next node or radio base station are passed to a priority queue that schedules the packets for transmission based on the location in the chain of the terminating node for each packet. Thus, packets that must traverse the most hops get the highest level of priority, while those that must traverse the least hops get the lowest level of priority. The priority level may also be dependent on other factors in addition to the number of hops that the packets must traverse. Other factors may include the data or application type associated with the call, the desired quality or service (QoS), or other factors determined by the service provider.

In one exemplary embodiment, the priority queue may comprise a plurality of sub-queues, a classifier, and a scheduler. Each sub-queue corresponds to a different priority level. The classifier classifies the packets according to the different priority levels. The priority level assigned to each packet depends on the number of hops the packet must traverse to reach its final destination. Each packet is placed in a sub-queue corresponding to the priority level assigned to that packet. A scheduler selectively fetches packets to be switched or transmitted from the sub-queues one at a time. After a packet is transmitted, the scheduler fetches the next packet from the highest priority sub-queue having packets waiting to be transmitted. By selectively fetching packets from the highest priority queue, the higher priority packets have less delay than lower priority packets.

The present invention may further include a mechanism to prevent undelivered packets from remaining for excessively long periods in the lower priority queues. One method of preventing excessive latency periods is to drop packets from the sub-queues after a predetermined time period has elapsed. In this case, the dropped packet would be retransmitted. Alternatively, a packet that remains in a sub-queue for a predetermined period of time may be immediately "promoted" and sent even though other higher priority packets are waiting transmission in higher priority sub-queues. Another solution is to set a minimum throughput rate for each sub-queue. When the throughput rate for a particular sub-queue drops below a threshold, packets in that sub-queue may be transmitted to maintain the throughput rate above the minimum throughput rate.

BRIEF DESCRIPTION OF THE DRAWINGS

FIG. 3 is a schematic diagram illustrating a radio access network according to the present invention.

DETAILED DESCRIPTION OF THE INVENTION

Figure 1:
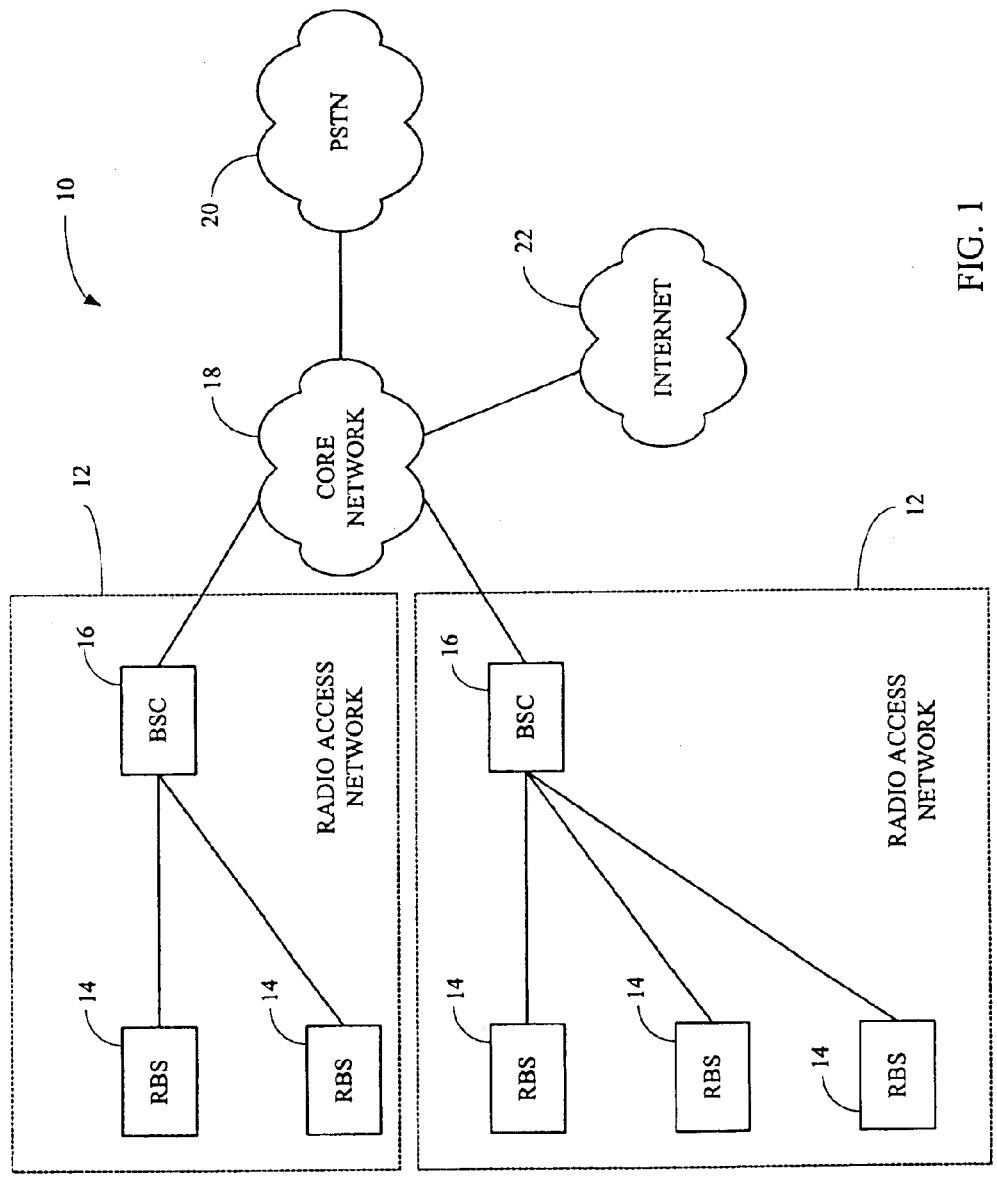
FIG. 1 is a schematic diagram of a mobile communication network.

Referring now to the drawings, FIG. 1 shows a schematic diagram of a mobile communication network indicated generally by the numeral 10. The mobile communication network 10 comprises one or more radio access networks 12 and a core network 18. Each radio access network 12 comprises a plurality of radio base stations 14 and one or more base station controllers 16. The radio base stations 14 are located in and provide wireless communication services to mobile terminals within a geographic region generally referred to as a cell. In general, there is one radio base station for each cell within the network 10. The radio base stations 14 receive information signals from and transmit information signals to mobile terminals within the corresponding cells.

Each radio base station 14 connects to a base station controller 16, which, in turn, connects to a core network 18, which may comprise a packet-switched or circuit-switched network. The core network 18 connects to the Public Switched Telephone Network (PSTN) 20 and/or to a Packet Data Network (PDN) 22, such as the Internet. The details of the core network 18 are not germane to the present invention.

As shown in FIG. 1, multiple radio base stations 14 connect to a single base station controller 16. The base station controller 16 manages the communication resources, such as the radio frequency channels, used by the radio base stations 14. The base station controller 16 additionally routes data between the radio base stations 14 and core network 18.

Figure 2:
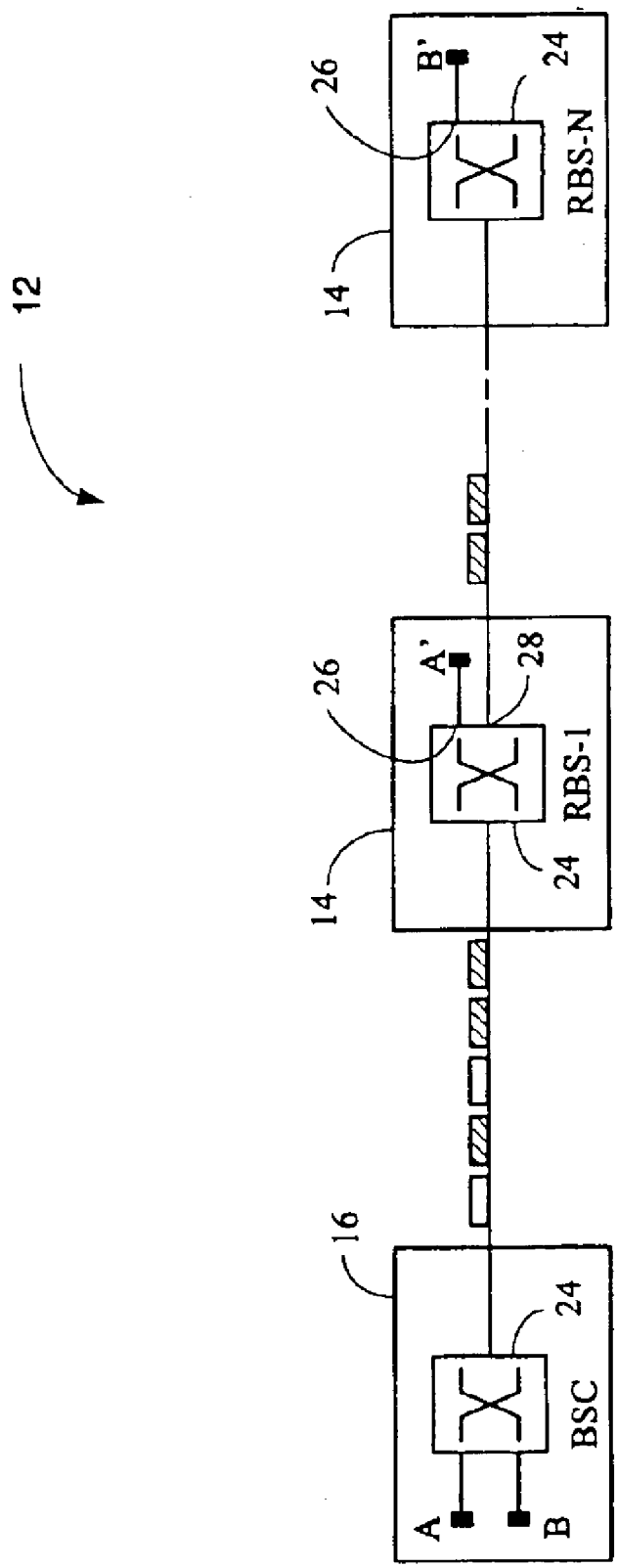
FIG. 2 is a schematic diagram illustrating a conventional radio access network having a series of radio base stations connected in a daisy chain configuration to a single base station controller.

FIG. 2 illustrates the radio access network 12 in more detail showing a method used in the past for connecting the radio base stations 14 to a base station controller 16. As shown in FIG. 2, the single base station controller 16 is connected with a series of radio base stations 14, which are denoted as RBS1 and RBS2. Although only two radio base stations 14 are shown, in practice there would likely be many more. FIG. 2 shows packets being transmitted on the backhaul between the base station controller 16 and the radio base stations 14. The packets may be data packets and/or compressed voice packets. For purposes of explaining the present invention, it is assumed that all packets being transmitted along the chain are of the same type and, absent the present invention, would be considered to be of equal priority.

The packets for all the radio base stations 14 are transmitted from the base station controller 16 over the same backhaul link. Packets intended for RBS-1 are transmitted between communication end points A and A'; those intended for RBS-N are transmitted between end points B and B'. The base station controller 16 and each radio base station 14 includes a switch 24 for switching packets. RBS-1 switches packets intended for RBS-1 to a local port 26 and packets destined for other radio base stations 14 to a second port 28 connecting to a second radio base station, denoted as RBS-2 (not shown). RBS-2, in turn, switches packets destined for RBS-2 to a local port 26 and packets destined for other radio base stations 14 to output port connecting to the next RBS. This process continues until the last radio base station 14, denoted as RBS-N is reached.

One disadvantage of the daisy chain topology for radio access network is that packets destined to the far end radio base station 14, e.g. RBS-N, traverses more hops than the near end radio base station 14, e.g., RBS-1. Therefore, packets intended for the far end radio base station 14 experience greater transmission delays than the near end radio base station 14. For certain applications, these transmission delays may produce a noticeable degradation in the quality of service provided to users connected to the far end station 14.

FIGS. 3a and 3b are schematic diagrams illustrating a radio access network 100 according to the present invention. The radio access network 100 comprises a base station controller 102 and a plurality of radio base stations 104. The radio base stations 104 are connected in a daisy chain configuration with the base station controller 102. The backhaul link connecting the base station controller 102 with the radio base stations 104 is a bi-directional link. FIG. 3a illustrates the connections between the base station controller 102 and the radio base stations 104 in the forward direction (from the base station controller 102 to the radio base stations 104). FIG. 3b illustrates the connections between the base station controller 102 and the radio base stations 104 in the reverse direction (from the radio base stations 104 to the base station controller 102). In the forward direction, the input 105 of the first radio base station 104 connects to an output 107 of the base station controller 102. The input 105 of subsequent radio base station 104 connects to an output 107 of a preceding radio base station 104. In the reverse direction, the output 107 of the first radio base station 104 connects to an input 105 of the base station controller 102. The output 107 of each subsequent radio base station 104 connects to the input 105 of the preceding radio base station 104. The base station controller 102 and each radio base station 104 thus comprises a node in the chain. Packets are passed along the chain from node to node.

Each node in the chain (e.g., base station controller 102 or radio base station 104) includes a switch 108 for switching packets. Switches 108 may, for example, comprise asynchronous transfer mode (ATM) switches or routers for switching Internet Protocol (IP) packets. Additionally, each node in the chain includes one or more multi-level priority queues 110. In the forward direction, the base station controller 102 includes a multi-level queue at an output of the base station controller 102. Each radio base station 104, except possibly the last radio base station 104, includes a multi-level queue 110 at an output of the radio base station 104. Additionally, each radio base station 104 may include a multi-level priority queue 110 at an input to the radio base stations 104. In the reverse direction, the base station controller 102 includes a multi-level priority queue 110 at an input to the base station controller 102. Each radio base station includes a multi-level priority queue 110 at an output of the radio base station 104. Additionally, each radio base station 104, except possibly the last radio base station 104, may include a multi-level queue 110 at an input to the radio base station 104.

The function of the multi-level priority queues 110 is to prioritize packets for switching or transmission to an adjacent node in the chain along the shared backhaul link joining the radio base stations 104 to the base station controller 104. The multi-level priority queue 110 at the input schedules packets waiting to be switched by switch 108. Even though packets may have been prioritized in a preceding node in the chain, packets may accumulate in a buffer or queue preceding the switch 108 if the switch is busy. While a lower priority packet is waiting in queue to be switched, higher priority packets may arrive and it may be desirable to switch the higher priority packets first through the switch 108. Similarly, the multi-level priority queue 110 at the output of a node schedules packets for transmission to the adjacent node in the chain. Even though the packets may be priortized by a multi-level queue 110 preceding the switch 108, locally generated packets do not pass through the multi-level priority queue at the input of the node 110. Therefore, the multi-level queue 110 at the output is needed to priortize packets at the output of the node. While the preferred embodiment illustrates two multi-level queues 110 at each node, those skilled in the will appreciate that a single multi-level queue 110 at each node could be used to achieve the same advantages of the present invention, but to a lesser degree. Further, the present invention could be practiced by placing priority queues only at selected nodes. These variations, are considered to be within the scope of the present invention.

Figure 4:
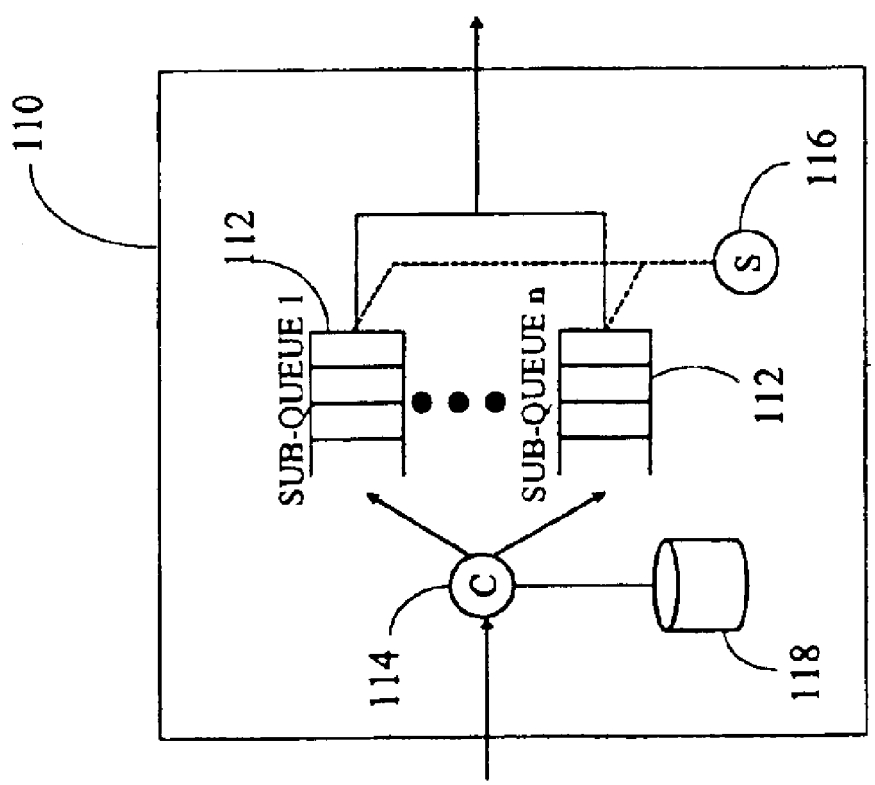
FIG. 4 is a schematic diagram illustrating a priority queue for a radio base station or base station controller in the radio access network of FIG. 3.

FIG. 4 illustrates an exemplary embodiment of a multi-level queue 110. As shown in FIG. 4, each multi-level priority queue 110 comprises two or more sub-queues 112, each of which is associated with a particular priority level. In the embodiment shown in FIG. 4, Sub-queue 1 is for buffering packets with the highest priority and Sub-queue n is for buffering packets with the lowest priority. A classifier 114 at the input of the multi-level priority queue 110 classifies and routes packets for transmission to the appropriate sub-queue 112. Scheduler 116 fetches packets from the sub-queues 112 for switching or transmission to the next node in the chain. In the embodiment disclosed herein, the scheduler 116 fetches packets one at a time from the sub-queues 112. After each packet is transmitted, the scheduler 116 fetches the next packet from the highest priority sub-queue 112 containing packets awaiting transmission. Thus, packets in the lower sub-queues 112 awaiting transmission will not be fetched by the scheduler 116 until all of the higher priority sub-queues 112 are empty. The scheduler 116 may operate in a preemptive or non-preemptive mode. In preemptive mode, if a data packet arrives having a higher priority than the packet currently being processed, the scheduler 116 stops processing the current packet to process the higher priority packet. In non-preemptive mode, the scheduler 116 completes processing of the current packet before processing the next packet, even if a higher priority packet arrives during processing.

In the embodiment described above, the scheduler 116 fetches packets one at a time from the sub-queues according to their priority. The method of fetching packets could be varied, for example, to prevent packets from remaining in the sub-queues 112 for excessive periods. If, for example, a large number of packets are received at a given node for the radio base station 104 at the end of the chain, which might occur if there are a large number of users in that cell, lower priority packets for radio base stations 104 closer to that node may remain in the priority queue 110 for an excessively long period before the high priority sub-queue 12 is emptied. A number of techniques may be used to prevent excessive delays. One method to prevent excessive accumulation of packets is to drop packets after a predetermined time period. In this case, a protocol such as the Transmission Control Protocol (TCP) will retransmit the packet. Alternatively, packets may be immediately "promoted" and sent after a predetermined time period has passed even though other higher priority packets are waiting transmission in higher priority sub-queues 112. Another solution is to set a minimum throughput rate for each sub-queue 112. When the throughput rate for a particular sub-queue 112 drops below the threshold, packets in that sub-queue 112 may are transmitted to maintain the throughput rate above the minimum throughput rate.

To implement the present invention, the classifier 114 must be able to determine the priority level of packets received at the input of the multi-level priority queue 110. For systems implementing the ATM protocol, a priority lookup table may be stored in a database 118 (FIG. 4) at each radio base station 104. The lookup table stores the priority level for each ATM connection, which is identified by the virtual path ID (VPI) and virtual circuit ID (VCI). When the ATM connection for a call is first set up, the base station controller 102 determines the location of the terminating radio base station 104 for the call and assigns a priority level. The base station controller 102 stores the priority levels in the priority lookup table for each VPI/VCI pair. The base station controller 102 also informs each radio base station 104 serving as a relay node for that call of the priority level assigned to packets associated with that call. The radio base stations 104 serving as relay nodes store the priority data along with circuit identification data in internal priority lookup tables at the radio base stations 104. The lookup tables associate the VPI/VCI pair with a particular priority level. The classifier 114 can therefore determine the appropriate sub-queue 112 for each packet being transmitted by looking up the priority level in the priority lookup table based on the VPI/VCI pair, which is contained in the header of ATM packets.

For Internet Protocol (IP) based radio access networks 100, no lookup tables are needed. The Differentiated Services (DS) field of IP packet headers can be used to indicate the priority level of a packet. The classifier 114 may read the DS field to classify the IP packets. The value of the DS field is determined during the call setup procedure by the base station controller 102 based on the location of the radio base station 104 on the daisy chain. The communication end point sets the DS field of each IP packet to be sent.

In the preceding discussion, it has been assumed that the multi-level queues 110 schedule packets for transmission based on the location of the terminating node, all other things being equal. In practice, factors other than the location of the terminating node may also be considered. For example, packets may be prioritized based on application type (e.g. streaming media), or based on a desired quality of service for different user classes. Certain applications, such as streaming media and voice applications cannot tolerate long latency periods. Therefore data associated with these application types may be given higher priority than other more tolerant applications. Similarly, packets associated with a "premium" user may be given higher priority than packets associated with a "typical" user. It is within the scope of the present invention to base priority on such additional factors in addition to the location of the terminating node in the chain.

What is claimed is:

1. A radio access network comprising:
    a base station controller;
    a plurality of radio base stations connected to the base station controller in a daisy chain configuration via a shared communication link, wherein the base station controller and each radio base station comprises a node in a chain;
    at least one node in the chain including a first priority queue for scheduling packets to be transmitted via the shared communication link to an adjacent node in the chain; and
    wherein the first priority queue schedules packets for transmission over the shared communication link based on a location of a terminating node for each packet.

2. The radio access network of claim 1 wherein the first priority queue is disposed at an output of the at least one node.

3. The radio access network of claim 2 further including a second priority queue disposed at an input of the at least one node.

4. The radio access network of claim 1 wherein the first priority queue is disposed at an input of the at least one node.

5. The radio access network of claim 1 wherein the shared communication link is a forward communication link for transmitting packets from the base station controller to the radio base stations.

6. The radio access network of claim 5 wherein the first priority queue is located at an output of the base station controller.

7. The radio access network of claim 5 wherein a first priority queue is located at an output of at least one radio base station.

8. The radio access network of claim 7 wherein a second priority queue is located at an input of each radio base station.

9. The radio access network of claim 1 wherein the shared communication link is a reverse communication link for transmitting packets from the radio base stations to the base station controller.

10. The radio access network of claim 9 wherein the first priority queue is located at an output of each radio base station connected to the shared communication link.

11. The radio access network of claim 10 wherein a second priority queue is located at an input of the each radio base station connected to the shared communication link except the last radio base station.

12. The radio access network of claim 11 wherein a first priority queue is located at the input of the base station controller.

13. The radio access network of claim 1 wherein the priority queue comprises:
    a plurality of sub-queues corresponding to different priority levels;
    a classifier to determine the priority level of the packets to be transmitted to the adjacent node and to route the packets to one of the sub-queues based on the priority levels of the packets; and
    a scheduler to fetch the packets from the sub-queues for transmission according to their priority level.

14. The radio access network of claim 13 wherein the scheduler fetches packets for transmission from the highest priority level sub-queue having packets to be transmitted.

15. The radio access network of claim 14 wherein the classifier determines the priority levels of the packets to be transmitted from information contained in packet headers of the packets to be transmitted.

16. The radio access network of claim 15 wherein the packets are IP packets and wherein the packet headers of the IP packets contain priority data.

17. The radio access network of claim 15 wherein the packets are ATM packets and wherein the packet headers of the ATM packets contain circuit identifiers used by the classifier to determine the priority levels of packets to be transmitted.

18. The radio access network of claim 17 further comprising a database storing priority data used by the classifier to determine the priority levels of packets to be transmitted.

19. The radio access network of claim 18 wherein the database stores a lookup table associating the circuit identifiers extracted from the headers of the ATM packets to corresponding priority levels for the packets to be transmitted.

20. The radio access network of claim 13 wherein the first priority queue drops packets from the sub-queues after a predetermined period of time has elapsed from the time the packets were placed in the sub-queues.

21. The radio access network of claim 13 wherein the first priority queue promotes packets for immediate transmission after a predetermined period of time has elapsed.

22. The radio access network of claim 13 wherein scheduler fetches packets from the sub-queues so as to maintain a minimum throughput rate for each sub-queue.

23. A radio base station for a radio access network, said radio base station comprising one node in a series of connected nodes on a shared communication link, said radio base station comprising:
    an input for receiving packets;
    a first priority queue for scheduling packets to be transmitted via the shared communication link to an adjacent node; and
    wherein the first priority queue schedules the packets for transmission over the shared communication link based on a location of the terminating node for each packet.

24. The radio base station of claim 23 wherein the first priority queue is disposed at an output of the radio base station.

25. The radio base station of claim 24 further including a second priority queue disposed at an input of the at least one radio base station.

26. The radio base station of claim 23 wherein the first priority queue is disposed at the input to the radio base station.

27. The radio base station of claim 23 wherein the first priority queue comprises:
    a plurality of sub-queues corresponding to different priority levels;
    a classifier to determine the priority level of the packets and to route the packets to one of the sub-queues based on the priority levels of the packets; and
    a scheduler to fetch the packets from the sub-queues for transmission according to their priority level.

28. The radio base station of claim 27 wherein the scheduler fetches the packets for transmission from the highest priority sub-queue having packets to be transmitted.

29. The radio base station of claim 28 wherein the classifier determines the priority levels of the packets to be transmitted from information contained in packet headers of the packets to be transmitted.

30. The radio base station of claim 29 wherein the packets are IP packets and wherein the packet headers of the IP packets contain priority data.

31. The radio base station of claim 30 wherein the packets are ATM packets and wherein the packet headers of the ATM packets contains a circuit identifier used by the classifier to determine the priority levels of packets to be transmitted.

32. The radio base station of claim 31 further comprising a database storing priority data used by the classifier to determine the priority levels of packets to be transmitted.

33. The radio base station of claim 32 wherein the database stores a lookup table associating the circuit identifiers extracted from the packet headers of the ATM packets to corresponding priority levels for the packets to be transmitted.

34. The radio base station of claim 27 wherein the first priority queue drops packets from the sub-queues after a predetermined period of time has elapsed from the time the packets were placed in the sub-queue.

35. The radio base station of claim 27 wherein the first priority queue promotes packets for immediate transmission after a predetermined period of time has elapsed.

36. The radio base station of claim 27 wherein scheduler fetches packets from the sub-queues so as to maintain a minimum throughput rate for each sub-queue.

37. A method implemented in a radio access network comprising a plurality of radio base stations connected in a daisy chain configuration with a base station controller, said method comprising:
    receiving packets at a radio base station in a chain of radio base stations to be transmitted to other radio base stations in the chain of radio base stations;

determining the location of the terminating radio base station in said chain of radio base stations for each of the packets to be transmitted determining a priority level of the packets based on the location of the terminating radio base stations for the packets;

scheduling the packets for transmission according to the priority levels of the packets.

38. The method of claim 37 wherein determining a priority level of the packets based on the location of the terminating radio base stations for the packets comprises determining the priority levels of the packets based on information contained in packet headers.

39. The method of claim 37 wherein the packets are IP packets and wherein the packet headers of the IP packets contain priority data.

40. The method of claim 37 wherein the packets are ATM packets and wherein the packet headers of the ATM packets contain a circuit identifier used to determine the priority level of packets to be transmitted.

41. The method of claim 40 further comprising storing priority data in a priority database used to determine the priority level of packets to be transmitted.

42. The method of claim 41 wherein the priority database stores a lockup table associating the circuit identifiers extracted from the packet headers of the ATM packets to corresponding priority levels for the packets to be transmitted.

43. The method of claim 37 wherein scheduling the packets for transmission according to the priority levels of the packets comprises:

classifying packets into two or more priority levels;

providing a sub-queue for each priority level; and routing packets to appropriate sub-queues based on the priority level of the packet.

44. The method of claim 43 wherein scheduling the packets for transmission according to the priority levels of the packets further comprises fetching packets from the sub-queues in an order dependent on the priority level of the packets.

45. The method of claim 44 wherein fetching packets from the sub queues in an order dependent on the priority level of the packets comprises fetching packets one at a time from the highest priority sub-queue containing packets to be transmitted.

46. The method of claim 37 further comprising dropping packets after a predetermined period of time has elapsed.

47. The method of claim 37 further comprising promoting packets for immediate transmission after a predetermined period of time has elapsed.

48. The method of claim 37 further setting a minimum throughput rate for each priority level, and scheduling packets for transmission so as to maintain the throughput rate for each priority level above the corresponding minimum throughput rate.

* * * * *

UNITED STATES PATENT AND TRADEMARK OFFICE
CERTIFICATE OF CORRECTION

PATENT NO. : 6,947,756 B2
APPLICATION NO. : 10/035948
DATED : September 20, 2005
INVENTOR(S) : Khan et al.

It is certified that error appears in the above-identified patent and that said Letters Patent is hereby corrected as shown below:

On the Title Page, in Field (56), under "U.S. PATENT DOCUMENTS", in Column 2, Line 4, delete "70/395.43" and insert -- 370/395.43 --, therefor.

In Column 9, Line 3, in Claim 37, after "transmitted" insert -- : --.

In Column 9, Line 25, in Claim 42, delete "lockup" and insert -- lookup --, therefor.

Signed and Sealed this

First Day of April, 2008

JON W. DUDAS
*Director of the United States Patent and Trademark Office*